United States Patent
Liu et al.

(10) Patent No.: US 8,520,337 B1
(45) Date of Patent: Aug. 27, 2013

(54) PERPENDICULAR MAGNETIC RECORDING WRITER POLE WITH LEADING AND TRAILING BEVEL SIDE WALL ANGLES AT AIR BEARING SURFACE

(75) Inventors: Feng Liu, San Ramon, CA (US); Zhigang Bai, Milpitas, CA (US); Yugang Wang, Milpitas, CA (US); Jinqiu Zhang, Fremont, CA (US); Ying Hong, Los Gatos, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/436,712

(22) Filed: Mar. 30, 2012

(51) Int. Cl.
*G11B 5/127* (2006.01)

(52) U.S. Cl.
USPC .................................. 360/125.13

(58) Field of Classification Search
USPC ............. 360/125.13, 125.12, 125.04, 125.26, 360/126.06, 125.3, 125.17, 125.03, 125.6, 360/125.1, 125.09, 125.15
See application file for complete search history.

(56) References Cited

U.S. PATENT DOCUMENTS

| | | | |
|---|---|---|---|
| 5,801,910 A * | 9/1998 | Mallary | 360/125.65 |
| 6,282,056 B1 | 8/2001 | Feng et al. | |
| 6,480,355 B1 | 11/2002 | Kamijima | |
| 6,487,041 B2 | 11/2002 | Yamanaka et al. | |
| 6,504,675 B1 | 1/2003 | Shukh et al. | |
| 6,754,947 B2 | 6/2004 | Stageberg et al. | |
| 6,891,697 B2 | 5/2005 | Nakamura et al. | |
| 6,940,690 B2 | 9/2005 | Tomiyama et al. | |
| 6,950,277 B1 | 9/2005 | Nguy et al. | |
| 6,995,949 B2 | 2/2006 | Nakamura et al. | |
| 7,221,539 B2 | 5/2007 | Takano et al. | |
| 7,324,304 B1 | 1/2008 | Benakli et al. | |
| 7,372,664 B1 | 5/2008 | Mallary et al. | |
| 7,712,207 B2 | 5/2010 | Pentek et al. | |
| 7,715,147 B2 | 5/2010 | Feldbaum et al. | |
| 7,768,743 B2 | 8/2010 | Guthrie et al. | |
| 7,796,360 B2 | 9/2010 | Im et al. | |
| 7,796,361 B2 | 9/2010 | Sasaki et al. | |
| 7,804,662 B2 | 9/2010 | Chen et al. | |
| 7,924,528 B2 | 4/2011 | Sasaki et al. | |
| 8,233,233 B1 * | 7/2012 | Shen et al. | 360/125.03 |
| 8,264,798 B1 * | 9/2012 | Guan et al. | 360/319 |
| 2005/0057853 A1 | 3/2005 | Nakamura et al. | |
| 2007/0211380 A1 | 9/2007 | Akimoto et al. | |
| 2007/0283557 A1 | 12/2007 | Chen et al. | |
| 2008/0151437 A1 | 6/2008 | Chen et al. | |
| 2008/0180861 A1 | 7/2008 | Maruyama et al. | |
| 2008/0273276 A1 | 11/2008 | Guan | |
| 2008/0273277 A1 | 11/2008 | Guan et al. | |
| 2008/0278861 A1 | 11/2008 | Jiang et al. | |
| 2009/0168242 A1 | 7/2009 | Liu | |

(Continued)

*Primary Examiner* — Allen T Cao

(57) ABSTRACT

A perpendicular magnetic recording transducer with leading and trailing bevel side wall angles at air bearing surface for use in a data storage device is provided. The transducer includes a magnetic writer pole having a pole tip facing an air bearing surface (ABS). The pole tip includes a pole tip face having a leading edge, a trailing edge, a first side wall, and a second side wall. The first side wall includes a first side wall section adjoining the leading edge and a second side wall section adjoining the trailing edge. The first side wall section is at a first angle measured from a perpendicular center line dividing the trailing edge. The second side wall section is at a second angle measured from a perpendicular center line dividing the trailing edge. The second angle is greater than three degrees. The first angle is greater than the second angle.

12 Claims, 5 Drawing Sheets

(56) References Cited

U.S. PATENT DOCUMENTS

| | | |
|---|---|---|
| 2009/0290257 A1 | 11/2009 | Kimura et al. |
| 2010/0146773 A1* | 6/2010 | Li et al. .................... 29/603.07 |
| 2011/0007428 A1 | 1/2011 | Batra et al. |
| 2011/0051293 A1* | 3/2011 | Bai et al. ...................... 360/313 |
| 2011/0116190 A1* | 5/2011 | Guan ............................ 360/122 |
| 2011/0205671 A1 | 8/2011 | Benakli et al. |
| 2011/0222188 A1 | 9/2011 | Etoh et al. |
| 2011/0273800 A1* | 11/2011 | Takano et al. ............ 360/125.12 |

* cited by examiner

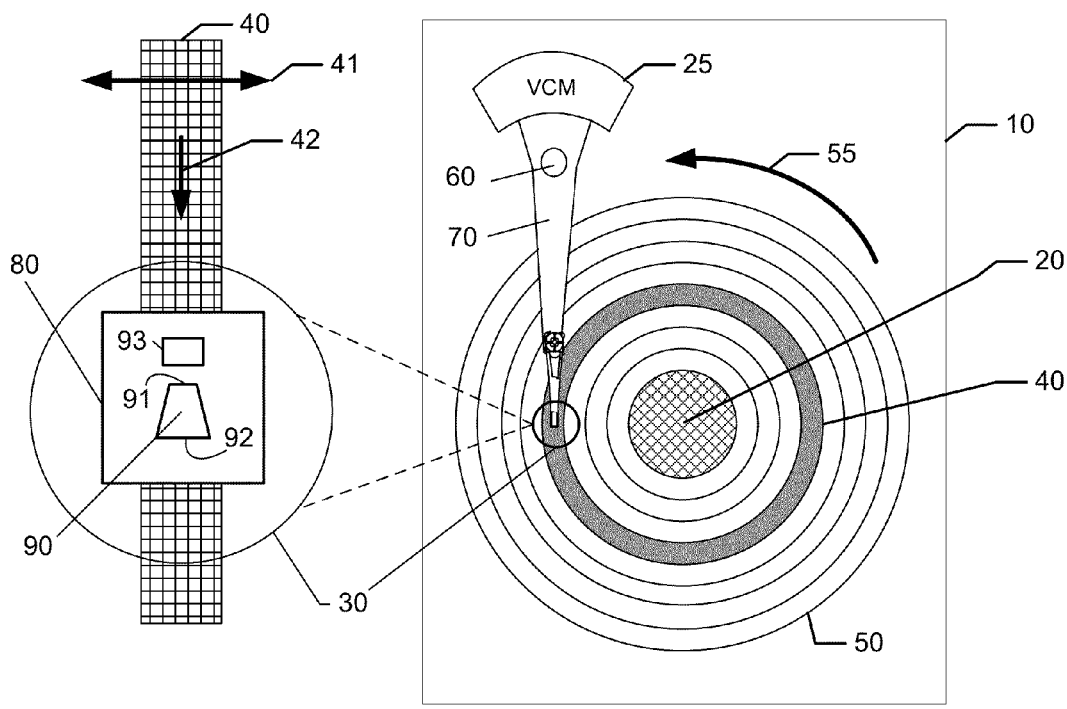
FIG. 1a  FIG. 1
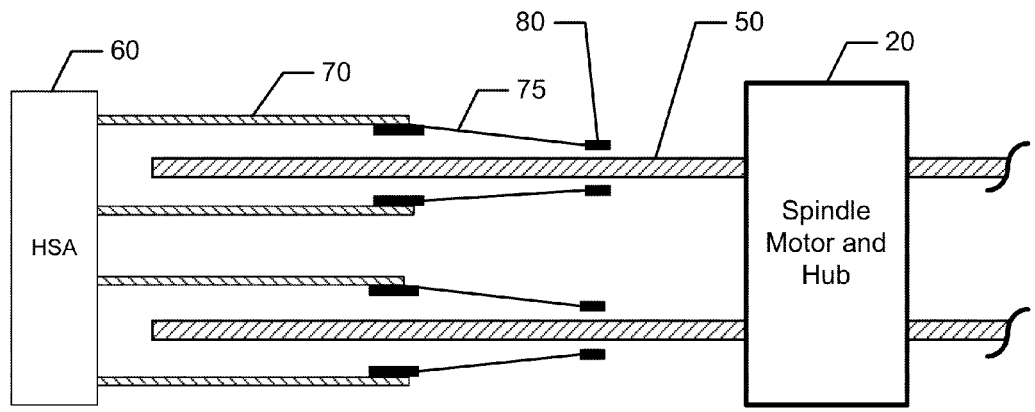
FIG. 2

| Column 1 | Col 2 | Col 3 | Col 4 | Col 5 | Col 6 | Col 7 | Col 8 | Col 9 |
|---|---|---|---|---|---|---|---|---|
| Category | H (top/bottom) (nm) | α1 (°) | α2 (°) | ROW (dB) | Hv (Oe) | dHv/dy | SHv-1Track (Oe) | SHv-Skew 1Track (Oe) |
| Case 0 | 90 | 12 | 12 | 31.28 | 8900 | 274095 | 2729 | 3755 |
| Case 1 | 45/45 | 16 | 6 | 32.13 | 8985 | 277915 | 2751 | 3766 |
| Case 2 | 45/45 | 18 | 4 | 32.01 | 8972 | 277652 | 2742 | 3731 |
| Case 3 | 45/45 | 18 | 3 | 32.25 | 8998 | 277957 | 2733 | 3737 |

FIG. 6

PERPENDICULAR MAGNETIC RECORDING WRITER POLE WITH LEADING AND TRAILING BEVEL SIDE WALL ANGLES AT AIR BEARING SURFACE

BACKGROUND OF THE INVENTION

Disk drives typically use heads residing on sliders to read from and write to the magnetic media. Read and write transducers residing in the head are flown at a small, controlled spacing above the magnetic medium (disk) during read and write operations. An air bearing forms between the head and the disk due to the disk rotating at high speeds to provide controlled head to disk spacing. Magnetic fields emanating from the write transducer pole tip switch magnetization of the magnetic medium, i.e., writing to the medium. Among other factors, a smaller and more tightly controlled magnetic writing field will allow more data to be written in the same space, thereby increasing areal density.

FIG. 1 illustrates a conventional disk drive 10 used for data storage. Figures are not drawn to scale and only certain structures are depicted for clarity. Disk media 50 is attached to spindle motor and hub 20. The spindle motor and hub 20 rotate the media 50 in a direction shown by arrow 55. Head Stack assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

FIG. 1a illustrates an enlarged view of a section of FIG. 1 including head 30 and track 40. A magnetic recording transducer 90 is fabricated on slider 80. Slider 80 may be attached to suspension 75 and suspension 75 may be attached to actuator arm 70 as shown in FIG. 2. A read transducer 93 is also fabricated on slider 90.

Referring again to FIG. 1a, Slider 80 is illustrated above recording track 40. Media 50 and track 40 are moving under slider 80 in an down-track direction shown by arrow 42. The cross-track direction is shown by arrow 41.

The magnetic recording transducer 90 has a leading edge 91 and a trailing edge 92. In this embodiment, the trailing edge 92 of recording transducer 90 is the final portion of magnetic transducer 90 that writes onto the recording track 40 as the media moves under the slider 80 in down-track direction 42.

FIG. 2 illustrates a side view of the disk drive 10 shown in FIG. 1. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

BRIEF DESCRIPTION OF THE DRAWINGS

FIGS. 1 and 1a illustrate a top view of conventional hard disk drive,

FIG. 2 illustrates a side view of a conventional hard disk drive

FIG. 6 illustrates a chart of performance characteristics according to several embodiments of the invention.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 3:
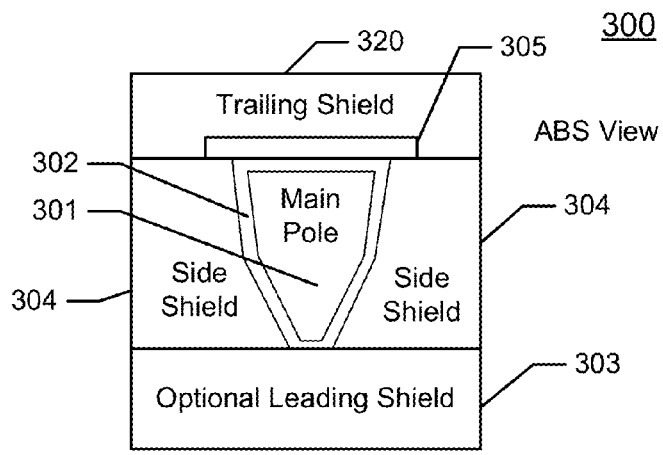
FIG. 3 illustrates an ABS view of a portion of a perpendicular magnetic head in accordance with one aspect of the subject invention.

FIG. 3 illustrates an embodiment of a portion of PMR transducer 300 shown in view from the ABS. Main pole 301 is depicted as a PMR pole having leading and trailing bevel side wall angles; an optional leading shield 303, nonmagnetic gap material 302, side shields 304, write gap 305, and trailing shield 320.

Figure 4:
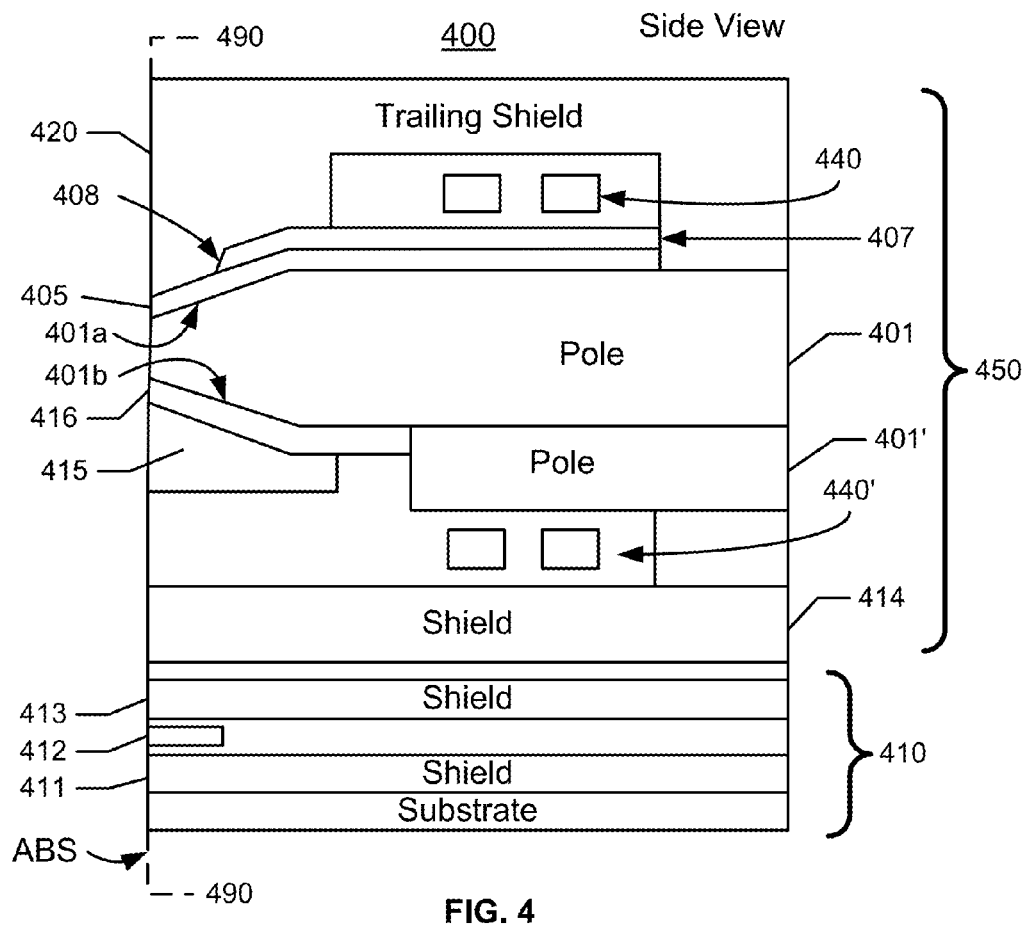
FIG. 4 illustrates a section of a side view of a portion of a perpendicular magnetic head in accordance with one aspect of the subject invention.

FIG. 4 illustrates an embodiment of the invention in a side section view of read/write head 400 incorporating a write transducer 450 and read sensor 410. FIG. 3 depicts an ABS view of a section of PMR transducer 300 only, while FIG. 4 depicts a side section view of read/write head 400 with ABS 490, including read sensor 410 and write transducer 450. The read sensor 410 may include shields 411 and 413 as well as sensor 412. Write transducer 450 shown in FIG. 4 includes shield 414, main pole 401, assist pole 401', coils 440 and 440', and trailing shield 420. Main pole 401 has trailing bevel 401a. Write transducer 450 may also include underlayer or optional leading shield 415, nonmagnetic layer 416, first gap layer 405, and second gap layer 407. Second gap layer 407 may have a recessed edge 408. Other and/or different components may be fabricated in other embodiments. For example, optional leading shield 303 shown in FIG. 3 and also shown as optional leading shield 415 in FIG. 4 may be included. In addition, main pole 401 is shown including optional leading edge bevel 401b. However, in some embodiments, the bevel 401b may be omitted. In another example (not shown), there may be an assist pole on top of main pole 401. In some embodiments, coupling layers, stop layers and/or seed layers may also remain between layers as part of the fabrication process.

Figure 5:
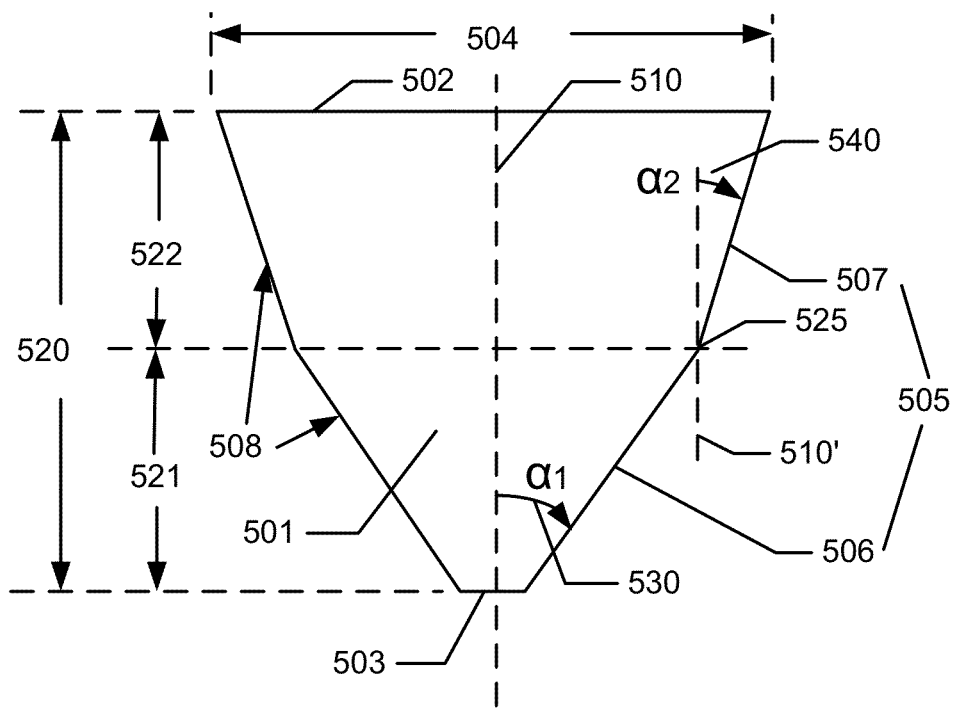
FIG. 5 illustrates an ABS view of a portion of a main pole tip in accordance with one aspect of the subject invention.

FIG. 5 illustrates an embodiment of the invention in an ABS view of main pole 501 similar to main pole 301 in FIG. 3 and main pole 401 in FIG. 4. In FIG. 5 however, only main pole 501 is illustrated, and other elements are not shown for clarity.

Main pole 501 has trailing edge 502 having width 504, leading edge 503, side wall 505, side wall 508, and pole height 520. Side wall 505 has a first side wall section 506 and a second side wall section 507. First side wall section 506 adjoins to leading edge 503 and extends at a first angle ($\alpha 1$) 530 a first distance 521 from leading edge 503 to joint 525. First angle ($\alpha 1$) 530 is measured from a center line 510 drawn perpendicular to trailing edge 502 (i.e., the center of width 504). Second side wall section 507 joins first side wall section 506 at joint 525 and extends to trailing edge 502 at a second angle ($\alpha 2$) 540 a second distance 522.

In one aspect of the invention, the first side wall section 506 and the second side wall section 507 join at a distance 521 approximately one half of distance between leading edge 503 and trailing edge 502. In another aspect of the invention, the first side wall section 506 and the second side wall section 507 are approximately equal in length.

In another aspect of the invention, the first side wall section 506 and second side wall section 507 join at a distance 521 between approximately forty percent and sixty percent of distance 520.

In a further aspect of the invention, the first angle ($\alpha$1) 530 is between approximately 15 and 20 degrees. In another aspect of the invention the first angle ($\alpha$1) 530 is between approximately 16 and 18 degrees.

In another aspect of the invention, second angle ($\alpha$2) 540 is between approximately 3 and 6 degrees.

In one embodiment of the invention, the first angle ($\alpha$1) 530 is between approximately 16 and 18 degrees, the second angle ($\alpha$2) 540 is between approximately 3 and 6 degrees, the first side wall section 506 and second side wall section 507 adjoin at a distance between approximately forty percent and sixty percent of the distance between the leading edge 503 and the trailing edge 502.

In one aspect of the invention, the distance 520 from leading edge 503 to the trailing edge 502 is between approximately 60 nanometers (nm) and 120 nm.

In another aspect of the invention, the first side wall 505 and second side wall 508 are substantially symmetric with respect to a perpendicular center line dividing the trailing edge 502.

In one embodiment of the invention, a disk drive comprises a slider including a magnetic transducer, the magnetic transducer including a writer pole, the writer pole having a pole tip facing an air bearing surface (ABS); the pole tip comprising a pole tip face; the pole tip face comprising a leading edge, a trailing edge, a first side wall, and a second side wall; the first side wall comprising a first side wall section adjoining the leading edge and a second side wall section adjoining the trailing edge, wherein: the first side wall section is at a first angle ($\alpha$1) measured from a perpendicular center line dividing the trailing edge; the second side wall section is at a second angle ($\alpha$2) measured from a perpendicular center line dividing the trailing edge, the first angle ($\alpha$1) is greater than the second angle ($\alpha$2), and the second angle ($\alpha$2) is greater than approximately three degrees.

FIG. 6 illustrates a chart of performance characteristics according to several embodiments of the invention. In Column 1, four cases are labeled Case 0 through Case 4. Case 0 is without the dual bevel side wall angles; and cases 1-3 each has dual bevel side wall angles with different selected bevel angles according to different embodiments of the invention. In Column 2, H is writer pole thickness (i.e., the distance H between the leading and trailing edges of the pole at ABS). Cases 1-3 have bottom writer pole portion at ABS with thickness H/2, and top writer pole portion at ABS with thickness H/2. For case 0, therefore, since there is only one side wall angle, the pole thickness is H=90 nm at the ABS. In cases 1-3, the total pole at ABS thickness is selected to be H=90 nm, with top and bottom portion both 45 nm. Column 3 defines the selected first bevel side wall angle ($\alpha$1) for bottom portion writer pole at the ABS, and Column 4 defines the selected top bevel side wall angle ($\alpha$2) of the writer pole at the ABS. Column 5, ROW (dB) is calculated reverse overwrite for the selected cases. Column 6, Hv (Oe) is calculated vertical field (out of ABS plane) for the selected cases. Column 7, dHv/dy is calculated write down track field gradient (proportional to SNR) for the selected cases. Column 8, SHv-1Track (Oe) is calculated side field (to indicate adjacent track interference at mid diameter of the recording medium) for the selected cases. Column 9, SHv-Skew 1Track (Oe) is calculated side field at skew (to indicate adjacent track interference at inner diameter and outer diameter of the recoding medium) for the selected cases.

Each of cases 1-3 having dual bevel side wall angles show performance benefits over case 0 that has only a single bevel side wall angle. For example, case 3 shows about 1 dB gain in reverse overwrite, improved down track field gradient (dHV/dy), as well as reduced off track side field at skew writing (or improved ATI margin at skew writing). Other cases show various benefits and trade-offs that provide advantages over case 0 that may be selected by the designer. The cases in FIG. 6 are examples of embodiments within the scope of the invention, but are not intended to limit the scope of the invention. It will be clear to those of ordinary skill in the art that other selections may be made within the scope and spirit of the invention.

Figure 7:
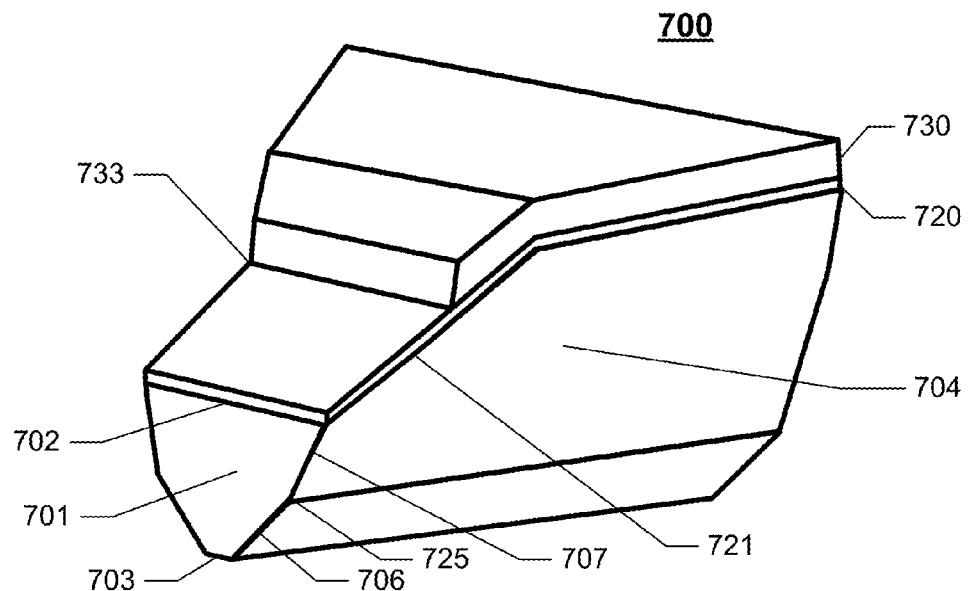
FIG. 7 illustrates a perspective view of a section of a main pole tip in accordance with one embodiment of the invention.

FIG. 7 illustrates a perspective view of a section of a main pole 700 in accordance with several embodiments of the invention. Main pole tip 700 comprises magnetic pole tip 704 having a trailing bevel 721, but without a leading side bevel. Main pole tip 704 has an ABS facing surface 701. Surface 701 has leading edge 703, trailing edge 702, first side wall 706, and second side wall 707. First side wall 706 joins second side wall 707 at joint 725. A write gap layer 720 overlays main pole tip 704. In an embodiment, a nonmagnetic spacer layer 730 may overlay write gap 720 on pole tip 704, and may extend onto trailing bevel 721, or may end on trailing bevel 721 short of surface 701. A trailing shield (not shown) may be deposited over both write gap layer 721 and spacer layer 730.

Figure 8:
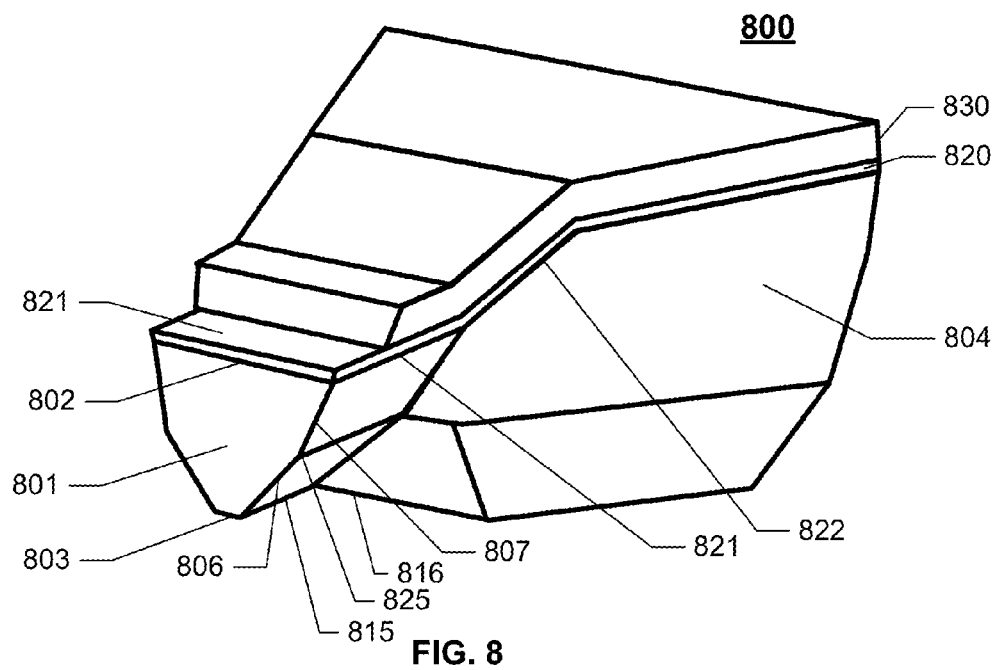
FIG. 8 illustrates a perspective view of a section of a main pole tip having a leading edge bevel in accordance with one embodiment of the invention.

FIG. 8 illustrates a perspective view of a section of a magnetic pole tip 800 having a leading edge bevel in accordance with several embodiments of the invention. Main pole tip 800 comprises magnetic pole tip 804 having a first trailing bevel 821, second trailing bevel 822, first leading bevel 815, and second leading bevel 816. Main pole tip 804 has an ABS facing surface 801. Surface 801 has leading edge 803, trailing edge 802, first side wall 806, and second side wall 807. First side wall 806 joins second side wall 807 at joint 825. A write gap layer 820 overlays main pole tip 804. In an embodiment, a nonmagnetic spacer layer 830 may overlay write gap 820 on pole tip 804, and may extend onto trailing bevel 821, or may end on trailing bevel 821 short of surface 801. A trailing shield (not shown) may be deposited over both write gap layer 821 and spacer layer 830.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosures are explicitly recited in the above description.

We claim:

1. A recording transducer for use in a data storage device, the transducer comprising a magnetic writer pole, the magnetic writer pole having a pole tip facing an air bearing surface (ABS);
   the pole tip comprising a pole tip face at the ABS;
      the pole tip face comprising a leading edge, a trailing edge, a first side wall, and a second side wall;
      the first side wall comprising a first side wall section adjoining the leading edge and a second side wall section adjoining the trailing edge, wherein:
         the first side wall section is at a first angle ($\alpha1$) measured from a perpendicular center line dividing the trailing edge;
         the second side wall section is at a second angle ($\alpha2$) measured from a perpendicular center line dividing the trailing edge, the second side wall section adjoining and sharing an edge with the first side wall section;
         the second angle ($\alpha2$) is greater than approximately three degrees, and
         the first angle ($\alpha1$) is greater than the second angle ($\alpha2$).

2. The magnetic recording transducer in claim 1, wherein: the first side wall section and the second side wall section adjoin approximately one-half the distance between the leading edge and the trailing edge.

3. The magnetic recording transducer in claim 1, wherein: the first side wall section and the second side wall section adjoin at a distance between approximately forty percent and sixty percent of the distance between the leading edge and the trailing edge.

4. The magnetic recording transducer in claim 1, wherein: the first side wall section and the second side wall section are approximately equal in length.

5. The magnetic recording transducer in claim 1, wherein: the first angle ($\alpha1$) is between 12 and 20 degrees.

6. The magnetic recording transducer in claim 1, wherein: the first angle ($\alpha1$) is between approximately 16 and 18 degrees.

7. The magnetic recording transducer in claim 1, wherein: the second angle ($\alpha2$) is between approximately 3 and 6 degrees.

8. The magnetic recording transducer in claim 1, wherein: the first angle ($\alpha1$) is between approximately 16 and 18 degrees;
the second angle ($\alpha2$) is between approximately 3 and 6 degrees;
the first side wall section and the second side wall section adjoin at a distance between approximately forty percent and sixty percent of the distance between the leading edge and the trailing edge.

9. The magnetic recording transducer in claim 1, wherein: the distance from the leading edge to the trailing edge is between approximately 60 and 120 nanometers.

10. The magnetic recording transducer in claim 1, wherein: the first side wall and the second side wall are substantially symmetric with respect to a perpendicular center line dividing the trailing edge.

11. A disk drive comprising:
a slider including a magnetic transducer, the magnetic transducer including:
a writer pole, the writer pole having a pole tip facing an air bearing surface (ABS);
   the pole tip comprising a pole tip face at the ABS;
      the pole tip face comprising a leading edge, a trailing edge, a first side wall, and a second side wall;
      the first side wall comprising a first side wall section adjoining the leading edge and a second side wall section adjoining the trailing edge, wherein:
         the first side wall section is at a first angle ($\alpha1$) measured from a perpendicular center line dividing the trailing edge;
         the second side wall section is at a second angle ($\alpha2$) measured from a perpendicular center line dividing the trailing edge, the second side wall section adjoining and sharing an edge with the first side wall section, and
         the second angle ($\alpha2$) is greater than approximately three degrees, and
         the first angle ($\alpha1$) is greater than the second angle ($\alpha2$).

12. The disk drive in claim 11, wherein:
the first side wall section and the second side wall section adjoin approximately one-half the distance between the leading edge and the trailing edge.

* * * * *